Sept. 14, 1965  O. K. MULLEN  3,205,586
HEIGHT INDICATING GAUGE

Filed Oct. 19, 1962  2 Sheets-Sheet 1

INVENTOR.
OWEN K. MULLEN,
BY
McMorrow, Berman & Davidson
ATTORNEYS

Sept. 14, 1965 O. K. MULLEN 3,205,586
HEIGHT INDICATING GAUGE
Filed Oct. 19, 1962 2 Sheets-Sheet 2
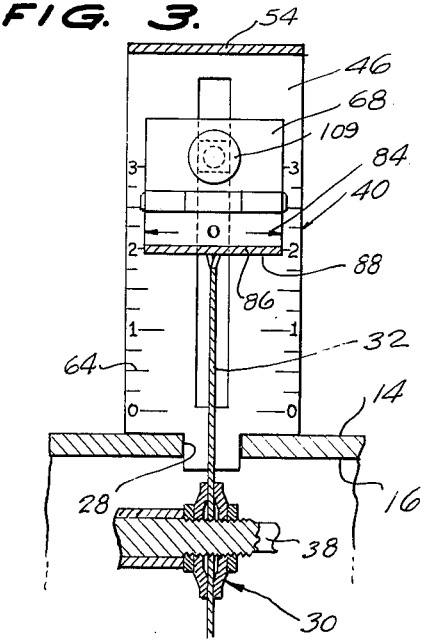
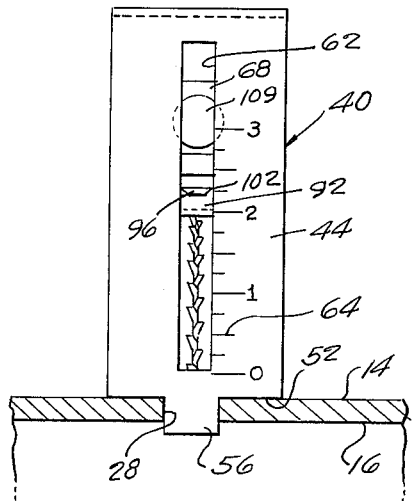
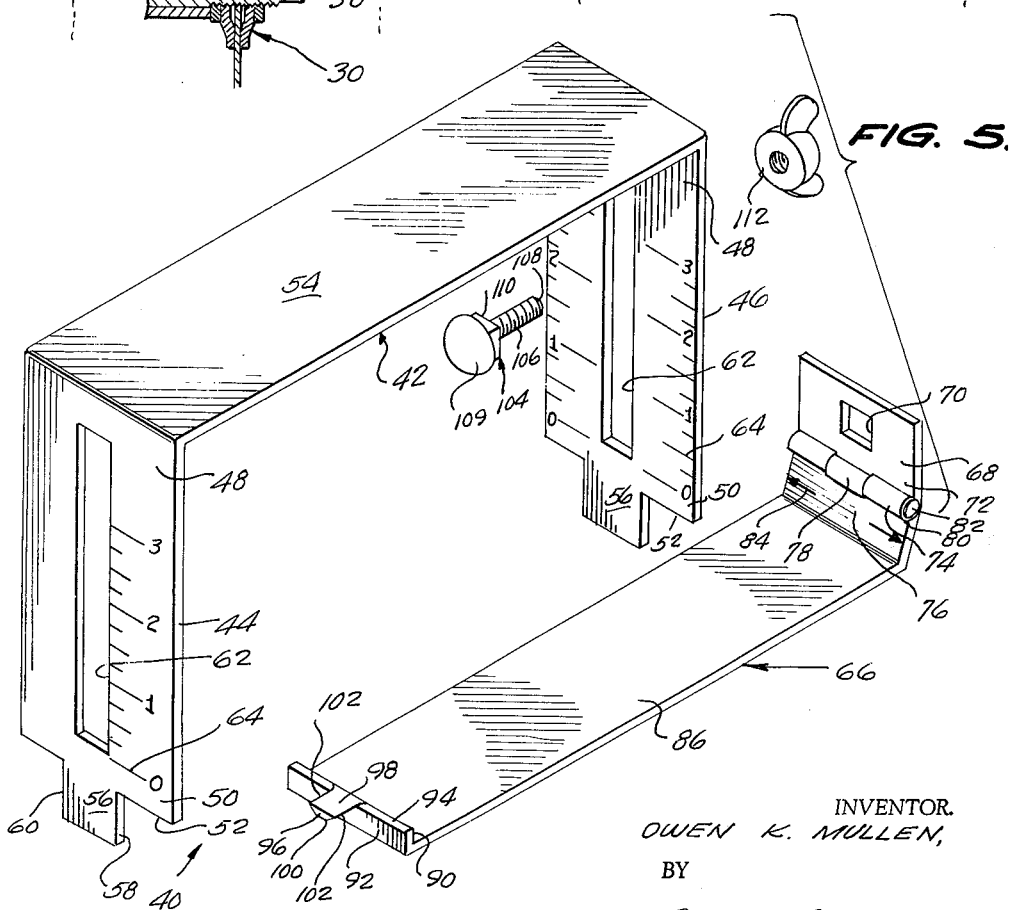
INVENTOR.
OWEN K. MULLEN,
BY
McMorrow, Berman & Davidson
ATTORNEYS.

United States Patent Office 3,205,586
Patented Sept. 14, 1965

3,205,586
HEIGHT INDICATING GAUGE
Owen K. Mullen, 2914 17th Ave. N., Texas City, Tex.
Filed Oct. 19, 1962, Ser. No. 231,706
4 Claims. (Cl. 33—185)

This invention relates to gauges, and more specifically, to a gauge used in combination with a table saw or like appliance for accurately determining the depth of cut of the saw by measurement of the projecting portion of the blade above the table.

An object of this invention is to supply a device of the character indicated which is non-complex in construction and assembly, inexpensive to manufacture and sell, and one which gives an accurate depth of cut reading without respect to variant factors often encountered in the use of appliances of this nature.

Many currently available devices of the type referred to as table saws include a saw blade movable with respect to the table, or the reverse, by the employment of elevation means. Depth of cut measurement devices are sometimes supplied in association with the elevation means, but such measurement devices cannot compensate for table wear, blade diameter, or other variants which arise through usage. It is therefore a basic objective of this invention to supply a gauge for depth measurement independent of the elevation mechanism and one which supplies an accurate reading without respect to changeable factors such as blade diameter and the like.

Other and further objects and advantages of this invention will become apparent from a consideration of the following specification when read in conjunction with the annexed drawings, in which:

FIGURE 3 is a sectional view on the line 3—3 of FIGURE 2, looking in the direction of the arrows;

FIGURE 4 is a view similar to FIGURE 3 but showing the gauge in front elevation; and FIGURE 5 is an exploded perspective view of the gauge per se.

Figure 1:
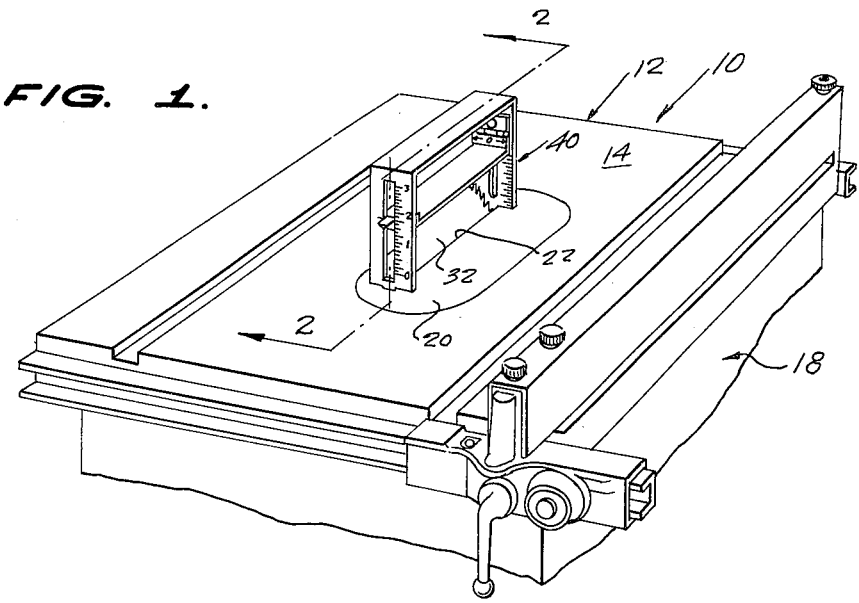
FIGURE 1 is a perspective view of a portion of a table saw with a gauge constructed and assembled in accordance with the teachings of this invention operatively disposed thereon.
Figure 2:
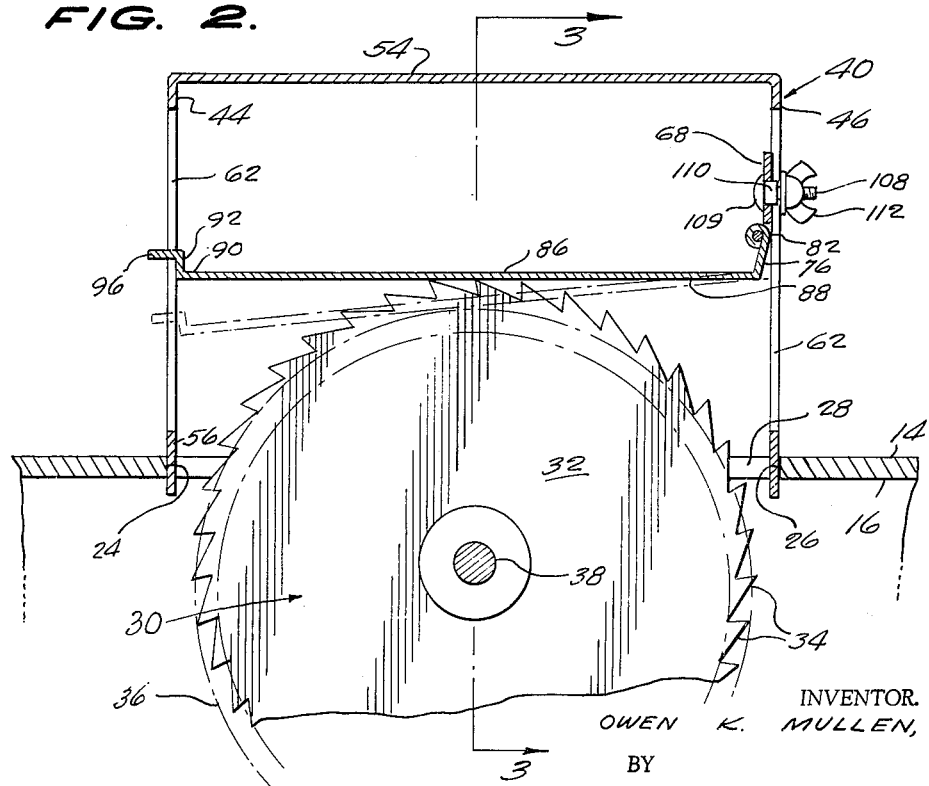
FIGURE 2 is an enlarged, sectional view taken substantially on the section line 2—2 of FIGURE 1, looking in the direction of the arrows.

Description of this invention requires, primarily, a general description of its environment—the table saw appliance or the like indicated in the drawings by reference character 10. The table saw 10 includes a saw table 12 having an upper side 14 and under side 16 mounted on an appropriate support 18. The table 12 includes a blade surrounding portion 20 which has an elongated, generally rectangular slot 22 therein, there being slot forward and rear walls 24, 26 and slot side walls 28. As best shown in FIGURES 2 and 3, a blade assembly 30 is supplied within the support 18, and includes a circular cutting blade 32 having teeth 34 the pointed edges of which are movable in substantially a peripheral edge 36 indicated by broken lines in FIGURE 2. The blade 32 is carried on a spindle 38 which is vertically movable by conventional elevation means (not shown).

The gauge of the present invention is generally identified by reference character 40 in the drawings, and includes an upstanding frame 42 comprised of a pair of forward and rear legs 44, 46, respectively. Each of the legs is substantially rectangular and has an upper end 48 with an end edge, and lower end 50 with end edge 52. The end edges 52 are adapted for supporting the frame 42 on the upper side 14 of the table 12, as appears in more detail below. The legs, at their upper end edges, are rigidly connected together by an elongated, substantially rectangular cross piece 54 which is of such length that the legs are spaced apart a distance less than, or equivalent to, the length of the slot 22. Projecting from the end edge 52 of each leg 44, 46 is a lug 56, with side edges 58, 60, of a width to fit between the slot side walls 28 whereby the frame 42 is positioned, uniformly, over the slot and the blade 32.

Each of the legs 44 and 46 has an elongated, substantially rectangular slot 62 formed therein—the slots of each leg being longitudinally aligned with one another, and each leg carries height indication markings or indicia 64 of selected gradation also longitudinally aligned.

Operatively mounted within the frame 42 is a movable indicator arm assembly 66. Assembly 66 includes a generally rectangular connection plate 68 which has a non-circular opening 70 (preferably square) which registers with the slot 62 of leg 46 when the sides of the plate 68 and leg 46 are co-terminus. The plate 68, at its lower end 72 terminates in hinge sleeve 74, and an angle plate 76 also of rectangular form and having a hinge sleeve 78 extended upwardly, from its upper end 80, between the sleeves 74, is pivotally connected thereto by a hinge pin 82. Suitable indication means 84, such as arrows, are carried by the angle plate 76 at each side.

Secured, integrally or by other rigid connection to the angle plate 76 is an elongated, substantially rectangular blade contact bar 86 including a lower side 88 and outer end 90. A finger support element 92 is fixedly secured to the bar 86 at the end 90 thereof and terminates in a free end edge 94. An indicating point finger 96 is fixed in substantially perpendicular relation to the element 92 and has a flat upper side 98 and arcuate under side 100 with sharp pointed edges 102 which serve as height indicators.

The indicator arm assembly 66 is movably connected to the frame 42 at leg 46 by a bolt assembly 104 which includes an elongated, threaded screw 106 with a free outer end 108 and a head 109 with inward boss 110 of non-circular form receivable in a non-rotatable condition in the opening 70 of the plate 68. The screw 106 extends through the opening 70 and the slot 62 of the leg 46 and has a wing nut 112 or the like threadedly received on the outer end 108 which, upon tightening, maintains the plate 68 at any selected location on the leg 46 within the range of locations made possible by the slot 62 thereof.

In operation, the arm assembly 66 is set at such location on the leg 46 that the indicating means 84 of the angle plate 76 points to the indicia on the leg 46 corresponding to a desired blade height when the bar 86 is held parallel to the cross piece 54. The lugs 56 are then seated in the slot 22 bearing against the slot end walls 24, 26 and with the end edges 52 of the legs 44, 46 resting on a table top 14. Blade 32 is then elevated or depressed with the peripheral edge 36 of the blade 32 bearing against the lower side 88 of the bar 86 causing the same to pivot upwardly or downwardly about the hinge pin 82. Elevation or depression continues until the points 102 are aligned with indicia 64 on leg 44 corresponding to the indicia previously selected and aligned with indicators 84. Thus, a definite measurement of the height of the blade 32 above the table top 14 is obtained.

Additional manners of usage will occur to those skilled in the art, the foregoing being offered by example only.

Having described and illustrated a form of this invention in somewhat complete detail, it will be understood that the description and illustrations are offered merely by way of example, and that the invention is to be limited in scope only by the appended claims.

What is claimed is:
1. In combination with a table saw including a saw table having a blade opening therein, a blade extending through said opening, and means for elevating and lowering the blade, a blade depth gauge comprising:
  (a) an upstanding frame having a pair of legs supported on the saw table above the blade;
  (b) the legs including upper and lower ends with end edges;
  (c) the upper ends being rigidly connected by an elongated cross piece of substantially the same length as the blade opening;
  (d) positioning lugs projecting into the blade opening from the lower end edges of the legs;
  (e) each of the legs having an elongated slot formed therein, the slots being in substantially longitudinal alignment;
  (f) height indicating indicia on each leg;
  (g) a movable indicator arm assembly movably connected on one leg and including:
    (1) a connector plate having an opening in registry with the slot of the one leg;
    (2) an angle plate hingedly connected to the connection plate and carrying height indication means;
    (3) an elongated blade periphery contact bar fixed at a selected angle to the angle plate;
    (4) a finger support element fixed to the blade contact bar in substantially perpendicular relation; and
    (5) an indicating point finger secured to the support element and extending through the slot in the other leg; and
  (h) the indicating point finger, when the blade contact bar contacts the blade and is parallel to the saw table top, being aligned with the indicia on the other leg corresponding to the indicia aligned with the indicia aligned with the height indication indicia of the angle plate and the indicia giving the height of cut of the blade.

2. A height indication gauge comprising:
  (a) an upstanding frame having a pair of legs;
  (b) the legs including upper and lower ends with end edges;
  (c) the upper ends being rigidly connected by an elongated cross piece;
  (d) positioning lugs on the lower end edges of the legs;
  (e) each of the legs having an elongated vertical slot formed therein, the slots being in substantially longitudinal alignment;
  (f) height indicating indicia on each leg;
  (g) a movable indicator arm assembly movably connected on one leg and including:
    (1) a connector plate having an opening in registry with the slot of the one leg;
    (2) an angle plate connected to the connection plate and carrying height indication means;
    (3) an elongated periphery bar fixed at a selected angle to the angle plate;
    (4) a finger support element fixed to the periphery bar in substantially perpendicular relation; and
    (5) an indicating point finger secured to the support element and extending through the slot in the other leg; and
  (h) the indicating point finger and the indication means of the angle plate being alignable with the height indication indicia of the legs.

3. A height indication gauge comprising:
  (a) a frame including legs adapted to be supported on a surface;
  (b) heighth indicating indicia on each legs;
  (c) a movable indicator arm assembly adjustably connected to one leg and including:
    (1) a connector plate adjustably secured to one leg;
    (2) an angle plate hingedly connected to the connector plate and having heighth indication means;
    (3) an elongated periphery bar secured to the angle plate; and
    (4) finger means connected to the periphery bar;
  (d) the finger means and the indicator means being alignable with the heighth indicating indicia of the respective legs.

4. A height indication gauge comprising:
  (a) a frame including upright legs having ends adapted to be supported on a surface;
  (b) heighth indicating indicia on each leg; and
  (c) an indicator assembly including a plate adjustably connected to one leg, and an elongated bar hingedly connected to said plate extending between said legs and carrying height indication means alignable with the indicating indicia on at least one of said legs.

References Cited by the Examiner
UNITED STATES PATENTS

| | | | |
|---|---|---|---|
| 385,321 | 6/88 | Pickering | 33—95 |
| 1,048,403 | 12/12 | Fritz | 33—172 |
| 1,799,566 | 4/31 | Price | 33—169 |
| 1,863,236 | 6/32 | Brienza | 33—144 X |
| 1,985,228 | 12/34 | Borroughs | 33—172 X |

ISAAC LISANN, *Primary Examiner.*